No. 743,205. PATENTED NOV. 3, 1903.
F. B. TUPPER & G. M. AUSTIN.
PAN.
APPLICATION FILED APR. 13, 1903.
NO MODEL.
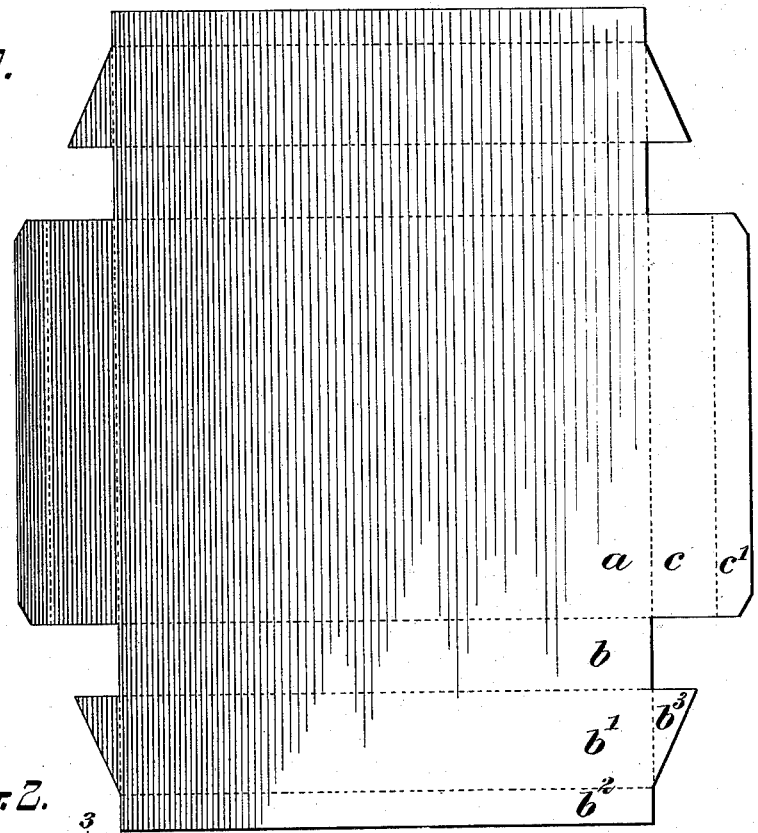
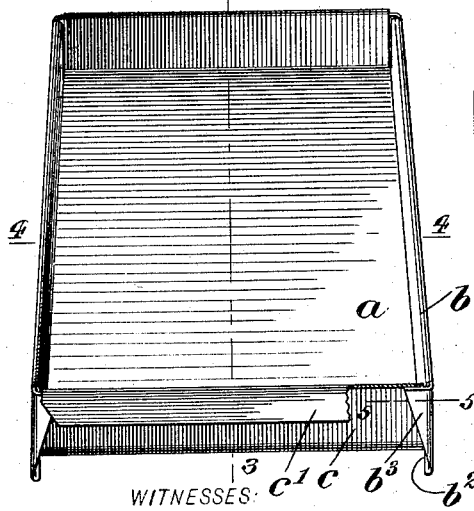
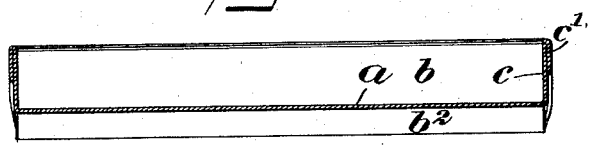
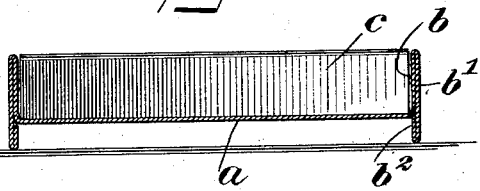
WITNESSES:
William P. Goebel.
Isaac B. Owens.
INVENTORS
Frank B. Tupper
George M. Austin
BY
ATTORNEYS.
THE NORRIS PETERS CO., PHOTO-LITHO., WASHINGTON, D. C.

No. 743,205. Patented November 3, 1903.

UNITED STATES PATENT OFFICE.

FRANK B. TUPPER AND GEORGE M. AUSTIN, OF NORTH BERWICK, MAINE.

PAN.

SPECIFICATION forming part of Letters Patent No. 743,205, dated November 3, 1903.

Application filed April 13, 1903. Serial No. 152,391. (No model.)

*To all whom it may concern:*

Be it known that we, FRANK B. TUPPER and GEORGE M. AUSTIN, citizens of the United States, and both residents of North Berwick, in the county of York and State of Maine, have invented a new and Improved Pan, of which the following is a full, clear, and exact description.

This invention relates to a pan intended especially for baking purposes, said pan being formed of an integral sheet of metal, the side and end walls being bent up and engaged together in a certain hereinafter-specified manner, so as to provide for ease of construction with a maximum degree of strength and durability.

This specification is an exact description of one example of our invention, while the claims define the actual scope thereof.

Reference is to be had to the accompanying drawings, forming a part of this specification, in which similar characters of reference indicate corresponding parts in all the views.

Figure 1 is a view of the blank from which the pan is formed. Fig. 2 is a perspective view of the pan with parts broken away. Fig. 3 is a section on the line 3 3 of Fig. 2. Fig. 4 is a section on the line 4 4 of Fig. 2, and Fig. 5 is a section on the line 5 5 of Fig. 2.

$a$ indicates the rectangular bottom of the pan. The side walls are formed of upwardly-bent sections $b$, from the upper edges of which pass downwardly the outer sections $b'$, and from the lower edges of said outer sections the inner reinforced sections $b^2$ project upward, these parts $b$, $b'$, and $b^2$ being stamped closely together to form a snug and strong connection and the part $b'$ being projected below the bottom $a$, so as to support said bottom out of contact with the surface on which the pan rests. As shown best in Figs. 1 and 2, the ends of the outer portions $b'$ of the side walls of the pan are formed with diagonal tabs $b^3$, which are of essentially diagonal shape, the wide portions of said flaps being uppermost (see Fig. 2) and said tabs tapering downward until they run into the ends of the outer portions $b'$ of the side walls. The end walls of the pan are formed of upwardly-projecting inner portions $c$ and flaps $c'$, projected downward from the upper edges of the portions $c$ and pressed tightly against said portions, as illustrated. The tabs $b^3$ are bent transversely to the side walls and laid against the outer sides of the inner portions $c$ of the end walls, and the flaps $c'$ are bent downward to cover the outer upper portions of the tabs $b^3$, as shown in Figs. 2 and 5, and the whole of said parts being pressed tightly together. This enables the pan to be easily pressed up into finished form by the use of machine-tools, and when finished all of the parts are so securely engaged as to render the pan practically indestructible by ordinary usage.

Having thus described our invention, we claim as new and desire to secure by Letters Patent—

1. A pan, comprising a bottom, side walls projecting upwardly therefrom and having tabs at their ends, said tabs being bent laterally inwardly, and end walls comprising an inner portion, and an outer downward flap projected downwardly from the upper edges of the inner portion and overlapping the upper portion of said tabs of the side walls, whereby to securely connect the side and end walls.

2. A pan, comprising a bottom, side walls projecting upwardly therefrom and having tabs at their ends, said tabs being bent laterally inwardly, and end walls comprising an inner portion, and an outer downward flap projecting downwardly from the upper edges of the inner portion and overlapping the upper portion of said tabs of the side walls, whereby to securely connect the side and end walls, all of said parts of the pan being formed from an integral section of sheet metal stamped up into the specified form.

3. A pan, comprising a bottom, side walls projecting upwardly therefrom and having tabs at their ends, said tabs being bent laterally inwardly, and end walls comprising an inner portion, and an outer downward flap projected downwardly from the upper edges of the inner portion and overlapping the upper portion of said tabs of the side walls, whereby to securely connect the side and end walls, the said tabs of the side walls being triangular in shape and gradually increasing in width as they extend upward, and the said flaps of the end walls being engaged with the widened upper portions of the tabs.

4. A pan, comprising a bottom, side walls projecting upwardly therefrom and having tabs at their ends, said tabs being bent laterally inwardly, and end walls comprising an inner portion, and an outer downward flap projected downwardly from the upper edges of the inner portion and overlapping the upper portion of said tabs of the side walls, whereby to securely connect the side and end walls, the said tabs of the side walls being triangular in shape and gradually increasing in width as they extend upward, and the said flaps of the end walls being engaged with the widened upper portions of the tabs, and all of said parts of the pan being formed of an integral section of sheet metal stamped up into the specified form.

In testimony whereof we have signed our names to this specification in the presence of two subscribing witnesses.

FRANK B. TUPPER.
GEORGE M. AUSTIN.

Witnesses:
HORACE MITCHELL,
MABEL B. WITHAM.